UNITED STATES PATENT OFFICE.

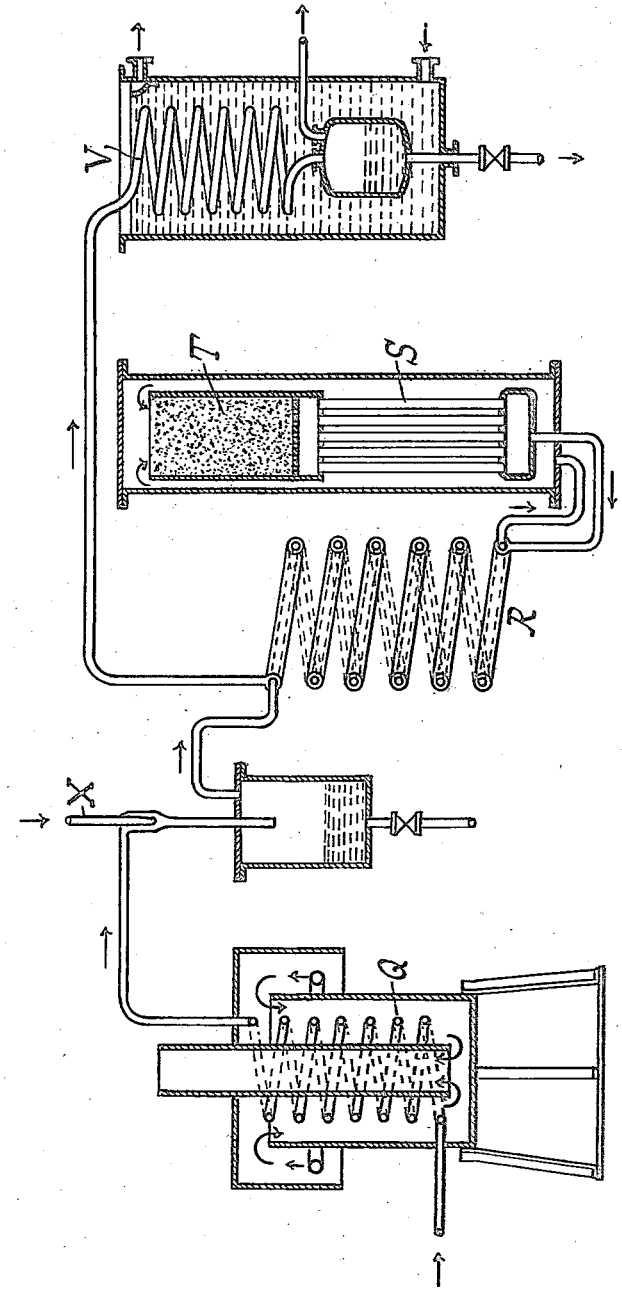

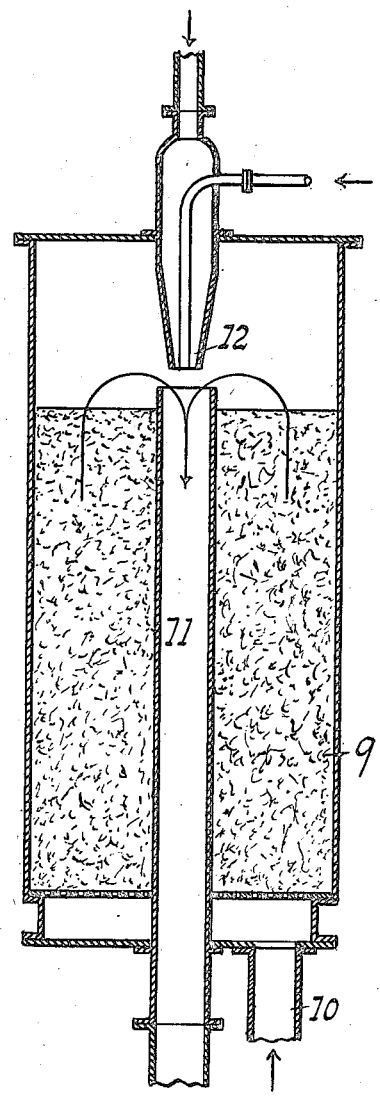

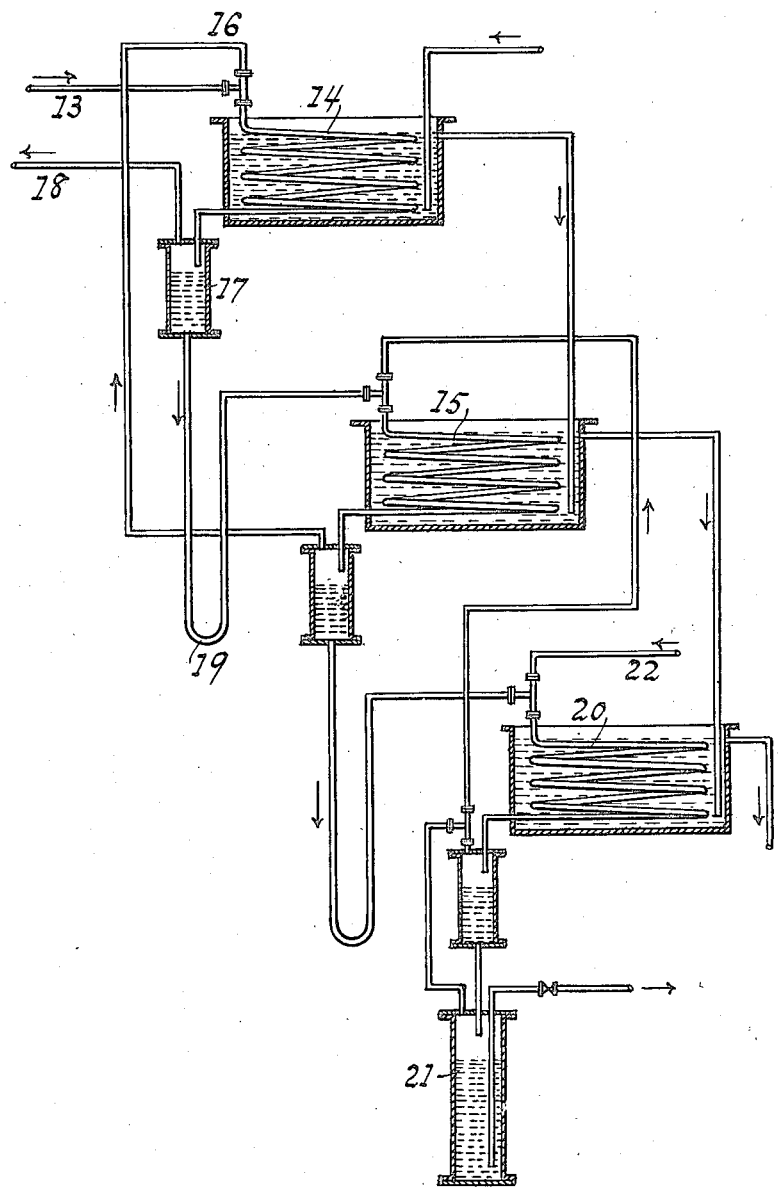

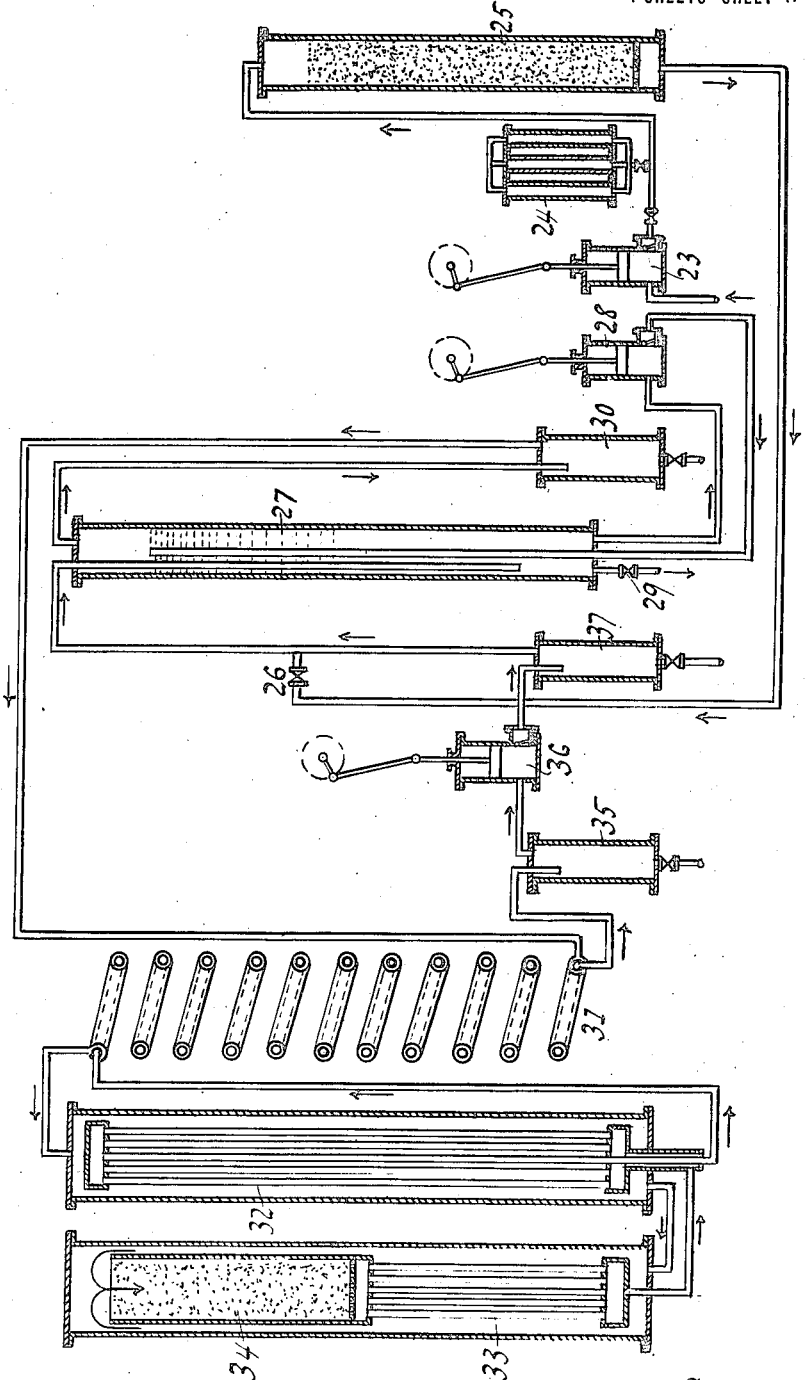

CARL BOSCH, OF LUDWIGSHAFEN-ON-THE-RHINE, GERMANY, ASSIGNOR, BY MESNE ASSIGNMENTS, TO THE CHEMICAL FOUNDATION, INC., A CORPORATION OF DELAWARE.

PROCESS AND MEANS RELATING TO THE PRODUCTION OF AMMONIA.

1,386,760.    Specification of Letters Patent.    Patented Aug. 9, 1921.

Application filed September 14, 1912. Serial No. 720,412.

*To all whom it may concern:*

Be it known that I, CARL BOSCH, Ph. D., subject of the King of Prussia, residing at Ludwigshafen-on-the-Rhine, Germany, have invented new and useful Improvements in Processes and Means Relating to the Production of Ammonia, of which the following is a specification.

In the specification of Letters Patent No. 1,006,206 and in the specifications of applications for patent Serial Nos. 512,680, 599,100, 599,101, 670,443, 670,444, 670,445, 670,446, 661,013, 661,014, and 675,618 are described methods of and relating to the synthetical production of ammonia by passing a mixture of nitrogen and hydrogen over a catalytic agent. In the present application are set forth more specifically features of and in connection with apparatus and processes for carrying out the synthetic production of ammonia on a commercial scale. Of the accompanying drawings in this application Figure 1 represents a vertical section of apparatus for obtaining hydrogen from water-gas and steam. Fig. 2 shows in vertical section a suitable apparatus for raising the contact mass to the requisite temperature while avoiding contamination of the said contact mass by the products of combustion. Fig. 3 represents in vertical section apparatus for absorbing ammonia from gases containing it, and Fig. 4 shows apparatus for producing ammonia by passing nitrogen and hydrogen over a catalytic agent. The hydrogen and nitrogen which are employed as initial products in the said synthetic manufacture of ammonia can be prepared in a diversity of ways. Thus, for instance, the hydrogen can be prepared electrolytically, that is to say, by the electrolysis of a suitable solution, for example, during the production of chlorin and caustic soda by electrolysis of sodium chlorid solution, in which case hydrogen is evolved as a by-product at the cathode. Another group of methods is based upon the removal of oxygen from water by means of carbon. The first of these methods of preparing hydrogen on a large scale may consist in fractionating water-gas by cooling the water-gas until it partly liquefies and then allowing the liquid to distil according to the method of Linde. For instance, the known process may be used in which two such circuits are combined. In the first circuit air is liquefied and fractionally separated, giving rise to nitrogen and oxygen while the circuit is so arranged that the cold produced is transferred to the second circuit, in which the water-gas is liquefied and is then fractionally separated giving rise, on the one hand, to hydrogen and, on the other hand, to carbon monoxid. Another of these methods of producing hydrogen from a mixture of hydrogen and carbon monoxid, such for instance as water-gas, consists in mixing the water-gas with steam and passing the mixture over a contact material, such for instance as iron, at a temperature of, say, from 400° to 600° C., when the carbon monoxid is converted into carbon dioxid, while a corresponding quantity of steam is reduced to hydrogen according to the equation $CO+H_2O=CO_2+H_2$. It is to be understood that the iron may be present, during the reaction, in the state of ferric oxid or ferrous oxid or compounds or mixtures of both and by using the word iron I do not confine myself to a peculiar state of this body, but I wish to include all forms which the iron may take during the reaction. The carbon dioxid can be separated from the hydrogen in any suitable manner or, in particular, in the manner hereinafter to be described. Apparatus for obtaining hydrogen from water-gas may be constructed, for example, as illustrated in Fig. 1. Water-gas is passed through the coil Q where it is preheated and steam is admitted through the pipe X, the mixture passing through the center tube of a double spiral regenerator R, then through the outer tube of the regenerator S through the contact mass T, where the water vapor and carbon monoxid react forming carbon dioxid and hydrogen, the resulting gases then pass through the regenerators S and R and then through the coil V, where any excess of steam is condensed. According to a third method of carrying out this process, hydrogen can be prepared for the synthetic production of ammonia by alternately oxidizing and reducing a suitable metal, such for instance as iron. Thus steam can be passed over iron at the requisite temperature so that iron oxid is produced and hydrogen obtained, and then, when the iron is oxidized to a sufficient degree, it is reduced by generator gas or an equivalent thereof, such for instance as water-gas or a suitable naturally occurring gas can be employed. The various gases are preferably heated to the necessary degree before being passed to the vessel containing the iron or iron oxid, as the case may be, so that this latter is maintained at the temperature suitable for the reaction.

The hydrogen prepared according to several of the above methods contains impurities, in particular carbon monoxid and carbon dioxid, which it is desirable to remove before employing the hydrogen for the production of ammonia. Any suitable method of removing these impurities may be employed, for instance any considerable quantity of carbon monoxid can be converted into carbon dioxid in a manner above described, while smaller quantities of carbon monoxid can be removed by passing the gases over caustic soda at a temperature of, say 200° C., and it is often advantageous to employ pressure, for instance up to two hundred atmospheres although higher pressures can be employed, if desired. Any large quantities of carbon dioxid can be removed by treating the gases with water under considerable pressure, in which case the solubility of the carbon dioxid in water is greatly increased and small quantities of water remove large quantities of carbon dioxid. Smaller traces of carbon dioxid can be removed by passing the gases over potassium carbonate, which is thereby converted into potassium bicarbonate according to the equation $$K_2CO_3 + CO_2 + H_2O = 2KHCO_3.$$

The minute traces of carbon dioxid which may remain after this treatment can then be removed by passing the gases over caustic soda.

The nitrogen which is employed for the synthetic production of ammonia can also be prepared in various ways. For instance, it can be prepared by fractionating liquefied air according to Linde's method and this fractionation may, as hereinbefore described, be carried out in conjunction with the fractionation of water-gas for the production of hydrogen. A second method of preparing nitrogen consists in burning hydrogen in the presence of air, and for the purpose of producing synthetic ammonia it is very advantageous to use a considerable excess of hydrogen, so that the resulting gases contain, in addition to water vapor, nitrogen and hydrogen in the proportion in which they are required for the synthetic production of ammonia. The reaction can be represented by the following equation:

$$14H_2 + \underbrace{4N_2 + O_2}_{\text{air}} = 2H_2O + 4N_2 + 12H_2.$$

It is then only necessary to remove the water from the gases, which can be done, for the greater part, by cooling until the water is condensed, while further smaller quantities can be removed by various reagents, such for instance as calcium chlorid, quicklime, phosphorus pentoxid, and the like, whereupon the remaining mixture of hydrogen and nitrogen is ready for use and can be passed into the system in which the ammonia is being produced.

Another method of preparing nitrogen consists in burning generator gas with air, whereupon a mixture of nitrogen and carbon dioxid is obtained. The carbon dioxid can be removed in the manner aforesaid, or in any other convenient way, and the nitrogen can be employed in the production of ammonia.

When hydrogen is burned in the presence of air in the manner described above, the nitrogen and hydrogen can be obtained ready mixed in the proportion desired for the production of ammonia. When the nitrogen and hydrogen are obtained separately, they are generally preferably mixed in the suction tube leading to the compressor. The gases must also undergo purification in order to remove any ingredients which might prove injurious either to the contact material or, for other reason, are undesirable. Thus, for instance, the water-gas, or the generator gas, should be washed with water and also passed through a dry purifier containing iron for the purpose of removing any sulfur or compounds containing sulfur. Various steps of purification can be carried out either while the gases are separate or mixed and while they are at ordinary pressure or while under compression, as is most convenient. In any case, it is desirable to pass the gases after compression, but before being introduced into the actual circuit in which the manufacture and absorption of the ammonia are taking place, over material as far as possible identical with the contact material and also maintained at about the same temperature as is employed for the said contact material. This has the effect of removing from the gases any matter which would otherwise injure the contact material. Thus for instance if iron is employed as the contact material, the compressed gases, before entering the actual manufacturing circuit, should be passed through an auxiliary furnace containing iron material similar to that used as the contact, whereupon any injurious traces of sulfur and oxygen are retained, injurious carbon monoxid is converted into indifferent methane and the gases are generally freed from ingredients which might injure the actual iron contact upon which the manufacture of the ammonia is dependent.

The compression of the gases to the desired degree, for instance to from 150 to 200 atmospheres, is preferably brought about with successive compressions, and the heat generated during each compression can be removed, wholly or in part, before subjecting the gases to the next step. In order to prevent the system attaining too high a pressure and to prevent any great variation in the pressure, a battery of gas cylinders capable of withstanding a high pressure and acting as a reservoir for the gases, is inserted into the system between the compressor and the purifier through which the gases pass before they enter the actual manufacturing circuit. The battery of gas cylinders is also of use when the compressors cease to work for a short time, as the gas contained in the battery is then able to supply the circuit with a fresh mixture of gases during the interval. The cylinders are consequently generally kept at a somewhat higher pressure than that obtaining in the circuit. The gases, after being compressed to the desired degree and having passed through the purifier, enter the actual circuit and pass to the actual contact furnace through one or more heat regenerators, in which they take heat from the gases leaving the contact furnace. It is preferred to pass the cold gases first of all through the outer tube of two tubes which are arranged concentrically in a spiral, the whole double spiral being carefully insulated so as to conserve the heat as far as possible. After the gases leave this first regenerator, they pass through a second, consisting of a number of narrow tubes situated inside one broader tube. This second regenerator is also carefully insulated. After the gases leave the second regenerator they pass through a third regenerator which is directly attached to the end of the contact tube or furnace and which also consists of a number of narrow tubes contained in one large tube. Here the gases traveling toward the contact mass are enabled to extract heat from the very hot gases just leaving the contact furnace and they then pass along outside the said furnace to the other end thereof and then reverse their direction of flow and pass into and through the contact furnace, where a certain proportion of them is converted into ammonia. These gases containing ammonia then pass through the narrow tubes of the third regenerator, thence toward the narrow tubes of the second and through them, and finally through the inner spiral tube of the first. They are then drawn by a circulating pump and passed to apparatus where they are treated in any suitable manner as hereinafter described in order to remove the ammonia from them, and thence pass anew through the regenerators and contact mass. It is preferred to employ the different regenerators as above described since the spiral regenerator is best adapted for effecting a good interchange of heat and is consequently employed for absorbing as much heat from the treated gases as is possible, while the tubular regenerators, although not so efficient as the spiral regenerator, are better capable of resisting the action of the hydrogen and the high temperature and can also be connected with one another and with the contact furnace, in such a way that the connections can be chosen so as to resist the said action of the hydrogen and the high temperature. All parts of the apparatus including the connections are preferably insulated so as to retain heat as far as possible. The actual contact furnace consists preferably of a clay tube in which the contact mass is placed and is surrounded by a metal tube or tubes capable of withstanding the high pressure employed. These latter may be constructed, for instance, in the manner described in the aforesaid specification Serial No. 675,618, for instance they may consist of a wrought iron tube which retains the gases and is also practically unacted upon by hydrogen at the temperature employed, immediately surrounded by a perforated steel tube which is capable of supporting the pressure, but does not retain any hydrogen which may diffuse through the wrought iron of the tube. The reason for this construction is, as stated in the aforesaid application Serial No. 675,618, the fact that hydrogen at a high temperature and under pressure has the property of acting on steel containing carbon and rendering it incapable of supporting the desired pressure.

Any suitable catalytic agent can be employed in the contact tube, for instance, iron to which a substance capable of promoting the catalytic action thereof has been added, may be employed, or use may be made of uranium, or of osmium, or of tungsten, or of molybdenum, or of nickel, or cobalt, or of any one or more of the catalytic agents mentioned in the aforesaid specifications.

The temperatures at various points in the contact mass and at other points in the system can be conveniently measured by means of electrical thermoelements.

Although the reaction which results in the formation of ammonia from nitrogen and hydrogen is exothermic, it is necessary to raise the contact mass to a certain degree before the reaction will start. This can be effected in various ways, for instance a tube containing the contact material can be heated from the outside by means of a flame or fire or the like, or heat can be applied internally by means of an electrical resistance wire situated preferably in coils around the contact mass. A further method of supplying the heat which is necessary to start the reaction, or which may become necessary during the reaction owing to too great dissipation of heat in various places, consists in creating heat inside the contact mass by supplying a small jet of air or other gas containing oxygen, and causing the oxygen therein to combine with the hydrogen, whereupon a jet of flame is formed and this heats the contact material until the requisite temperature for starting the reaction has been attained. In order to cause the hydrogen and oxygen to combine in the first place, an electrical igniting device can be employed, or the mixture containing hydrogen and oxygen can be caused to impinge on a surface of platinum or the like. It is preferred to carry out the heating by causing the flame to burn inside a tube situated in the center of the catalytic agent, while the hydrogen and nitrogen pass up through the catalytic agent, mix with the oxygen and then pass down the said tube, being ignited either on entering the tube, or just before entering. In this way, the products of combustion are prevented from passing through the catalytic agent, such passage being undesirable, since they might affect its efficiency deleteriously. When sufficient heat has been generated in the said tube to raise the catalytic agent to a temperature sufficient to enable the catalytic combination of hydrogen and nitrogen to proceed, the oxygen supply is cut off and the nitrogen and hydrogen mixture is passed through the apparatus in the reverse direction, that is to say, the mixture passes up the central tube and then down through the catalytic agent. Apparatus for thus heating the catalytic material is illustrated in Fig. 2. In this 9 represents the catalytic material, through which a current of nitrogen and hydrogen is passed entering through the pipe 10 and, after leaving the catalytic agent, passing downward through the pipe 11. A combustible gas and oxygen are led through the pipes as shown in the figure and are caused to ignite at the nozzle 12. The flame and heated products of combustion pass together with the nitrogen and hydrogen down the tube 11, and the heat passes through the walls of the said tube 11 and heats the catalytic material 9. When the necessary temperature has been reached, the supply of combustible gas and oxygen to the nozzle 12 is stopped, and the nitrogen and hydrogen are then passed up through the tube 11, down through the catalytic agent, and the mixture of ammonia together with unchanged nitrogen and hydrogen passes away through the tube 10.

When more than one contact furnace is being employed, it is preferred to distribute the gases to the furnaces in parallel, so that each particular quantity of gas passes through one furnace and then is mixed with the gases leaving the other furnaces and passes along toward the apparatus for extracting the ammonia from the gases. In order to ascertain whether the gases are passing correctly through each of the contact furnaces, use can be made of the well known appliance in which the pressure of the gases on each side of a constriction in the tube supplying the gases to each of the furnaces is measured and, if desired, automatically registered. Any increase of velocity of the gases in any one of the said tubes immediately leads to alteration in the difference in pressure on each side of the said constriction in the tube and can at once be detected and remedied. As a rule, the gases containing ammonia pass to a circulating pump, of which, if desired, several can be employed; it is desirable that these circulating pumps should contain no parts of copper with which the gases could come into contact. The above arrangement is also of value, since any oil which may be taken up by the gases while passing through the pump cylinders is removed by the absorbing liquid and is not allowed to pass to the contact mass, which it might spoil. After leaving the circulating pump, the gases are cooled and contain, say, four per cent. by volume of ammonia. In order to extract this ammonia from the gases, resort may be had to cooling, so that the ammonia is obtained in liquid form. At a temperature of minus twenty degrees centigrade, about two per cent. of ammonia, that is, half of it, can be removed, while the other two per cent. remains in the gases, while at a temperature of minus eighty degrees centigrade, only 0.5% remains in the gases and 3.5% is obtained in the liquid form. The liquid ammonia thus obtained contains nitrogen and hydrogen in solution, and it is consequently necessary to fractionate the mixture in order to obtain the ammonia in a marketable form. If desired, the ammonia can be dissolved in water, and for this purpose can be passed through four wash-bottles in series on the countercurrent principle. Since the absorption is carried out while the gases are still under high pressure, say, 150 atmospheres, the water has to be pumped into the first wash-bottle and the absorbing liquid is also pumped from each bottle to the following, and moreover is subjected to a cooling process between each bottle. The wash-bottles can preferably be made of steel. When the liquid in the last wash-bottle has attained the desired strength, it can be drawn off by means of a suitable tap. Although it is possible, in carrying out the absorption under such high pressure, to obtain a very concentrated solution of ammonia in water, it is preferred to carry on the absorption only to that point at which an ammonia solution is obtained which, under ordinary pressure, is stable and does not evolve any large quantity of ammonia.

Another arrangement which is eminently suitable for absorbing the ammonia from the gases by means of water, consists of three coiled tubes situated one above the other so that water which is pumped under pressure into the top coil runs through this and then of its own weight runs down to the middle coil and, after passing through this, runs to the lowest coil and from this to a suitable receptacle, whence it can be drawn off in any suitable manner. In the meantime the gases containing ammonia are passed into the upper end of the lowest coil and through this in the same direction as the absorbing liquid. From the lower end of the lowest absorbing coil the gas leaves the absorbing liquid and is led to the upper end of the middle coil, so that in this coil also the gases and the absorbing liquid pass in the same direction through the coil, that is, from top to bottom. The gases leaving the lower end of the middle coil then pass to the upper end of the top coil and, as is the case in the other coils, the gases and the absorbing liquid pass through the coil in the same direction, that is, from top to bottom. Thus in the top coil the gases which are poorest in ammonia, since they have twice been subjected to the action of an absorbing liquid, are treated with fresh water and in this way a maximum of ammonia is extracted from the gases. Each of the absorbing coils should preferably be immersed in a water-bath or subjected to other means of cooling, so as to remove the heat caused by the absorption of the ammonia. Apparatus illustrating this method of absorbing ammonia is illustrated in Fig. 3. The absorbing liquid enters through the pipe 13 into the first absorbing coil 14, while the gas leaving the second absorbing coil 15 passes through the pipe 16 which also leads to the coil 14. The absorbing liquid and the residual gas leaving the coil 14 pass through the stripper 17, the gas being led away through the pipe 18, while the absorbing liquid enters the coil 15 after having passed through a siphon 19; then, after having passed through coil 15, it passes to a third coil 20. The concentrated ammonia solution is finally collected in a vessel 21, from which it can be led off as desired. The gases containing ammonia enter the absorbing system through the pipe 22 and take the path indicated by the arrows, passing in succession through the coils 20, 15 and 14, in each traveling through the said coils from top to bottom, that is, in the same direction as the absorbing liquid.

After the gases have been treated to remove the ammonia to the extent considered desirable, taking into consideration the difficulty of extracting the last traces, they are passed back again to the furnace, but on the way thither are passed through large strippers so that the velocity of the gases is greatly reduced and opportunity is given the water, whether as such or as vapor, to separate out from the gases. It is to be understood that the gases are maintained under pressure during the whole of the operation and kept in motion in the circuit by means of circulating pumps, that portion of the gases which combines to form ammonia, and is then removed from the system, being replaced by a fresh quantity of mixed hydrogen and nitrogen, pumped into the system as hereinbefore described.

Apparatus for carrying out the manufacture of ammonia according to the present invention is diagrammatically illustrated in Fig. 4. The mixture of hydrogen and nitrogen is raised by the compressor 23 to the necessary pressure, it being understood that although only one cylinder is shown, the compression can be carried out, if desired, in several steps. 24 represents a battery of steel cylinders which act as a reservoir for the compressed gases. 25 is a cylinder containing material similar to the catalytic agent employed and maintained under practically similar conditions to the actual catalytic agent. This said cylinder 25 is for the purpose of finally purifying the gases from any impurities which might damage the contact material or in any way decrease its efficiency. Some ammonia is generally formed in this cylinder. The gases then enter the manufacturing circuit through the valve 26 where they join the gases containing ammonia on their way from the catalytic material to the absorbing plant. This absorbing apparatus is, for the sake of simplicity, shown as one simple tube 27, in which the liquid is maintained in circulation by means of a pump 28. The ammonia solution is obtained from the valve 29 and any fresh absorbing liquid can be compressed into the system either by means of the pump 28 or by any suitable method. The gases leaving the absorption apparatus 27 pass through a stripper 30 which is comparatively large, so as to enable as much water as possible to separate from the gases which then pass through the outer tube of the spiral regenerator 31, then through the first tubular regenerator 32, through the second tubular regenerator 33, through the contact mass 34, back again through the three regenerators 33, 32, and 31, and through a stripper 35 to the circulating pump 36, which maintains the gas contained in the circuit in motion. The gases then pass through stripper 37, in order to separate off any oil, and then enter the absorbing apparatus 27, in the manner hereinbefore dscribed.

The gases in the circuit are from time to time analyzed, so that any excess of nitrogen or of hydrogen above the proportion in which they combine to form ammonia can be detected, and a corresponding alteration in the composition of the gases supplied to the circuit is made, so that the gases in the circuit are made to attain the requisite composition. As the reaction proceeds, especially if a gas containing a small proportion of methane be employed, there may accumulate in the circuit an indifferent gas, in particular, methane, and when this attains a certain percentage it becomes advisable to empty the gases from the circuit and replace them by fresh gases. Those removed from the circuit can be purified in any convenient manner and then returned to the circuit, as they are needed.

As there is a comparatively small market for aqueous solutions of ammonia, it is generally preferred to transform the ammonia into ammonium sulfate, or else to separate the ammonia from the water and convert it into the liquid form, which can then be preserved in steel cylinders and is then in a suitable form for transport. As a general rule, the aqueous ammonia solution has hitherto been heated and the gaseous ammonia which is driven off is either absorbed in dilute sulfuric acid, for the purpose of making ammonium sulfate, or else it is passed over quicklime in order to dry it, and it is then passed to the compressing machine. It has, however, been found that the ammonia can be obtained in a pure form free from water and oil by driving off the ammonia from the solution, cooling the gas, then compressing it and finally subjecting it to fractional distillation under pressure. The ammonia is then obtained in a form which is immediately suitable for compression, without its being necessary to pass it over quicklime or the like.

Should it become necessary to replace the catalytic agent, this can be done very conveniently and with a minimum of dismounting the apparatus by sucking out the catalytic agent by means of a vacuum, and it is preferred at the same time to pass a current of nitrogen through the vessel so as to prevent oxygen coming into contact with the hot walls of the catalytic furnace. Fresh catalytic agents can then be introduced into the vessel and the process re-started.

Now what I claim is:—

1. The process of producing ammonia which consists in treating a mixture of hydrogen and nitrogen under pressure with a catalytic agent, then passing it through a circulating pump, then removing ammonia which has been formed by the action of the catalytic agent, then adding a fresh quantity of nitrogen and hydrogen to the residual gases and passing the mixture again over the catalytic agent.

2. The process of producing ammonia which consists in repeatedly catalyzing a mixture of hydrogen and nitrogen and absorbing the ammonia formed by one catalysis and adding fresh mixture before the succeeding catalysis.

3. The process of producing ammonia by passing a mixture of hydrogen and nitrogen in combining proportions under pressure over a catalytic agent at a raised temperature and then abstracting from the gaseous mixture the ammonia which has been formed, and then passing the residual gases over the catalytic agent again and supplying fresh mixture of nitrogen and hydrogen to the circuit, but passing such fresh mixture over a purifying mass, practically similar to and maintained under practically similar conditions as the catalytic agent before the said fresh mixture enters the said circuit.

4. Apparatus for the production of ammonia from its elements comprising a vessel containing catalytic agent connected with tubular heat regenerators which are followed by a double spiral heat regenerator, the whole apparatus being capable of sustaining a great pressure.

5. Apparatus for the production of ammonia from its elements comprising a vessel containing catalytic agent and one or more regenerators of less efficiency but capable of sustaining a high pressure and temperature, said vessel being connected with a separate heat regenerator of great efficiency, but which is incapable of being attached to adjacent apparatus so as to be able to sustain simultaneously and permanently a high pressure and temperature, the whole apparatus being capable of sustaining a great pressure.

6. In the production of ammonia by combining nitrogen and hydrogen under pressure by means of a catalytic agent at a raised temperature, raising the catalytic agent to the necessary temperature by admitting gas containing oxygen and igniting the mixture of hydrogen and oxygen which is formed, and allowing the flame to burn in close proximity to the catalytic agent.

7. In the production of ammonia by combining nitrogen and hydrogen under pressure by means of a catalytic agent at a raised temperature, raising the catalytic agent to the necessary temperature by admitting gas containing oxygen and igniting the mixture of hydrogen and oxygen which is formed, and allowing the flame to burn in close proximity to the catalytic agent, but preventing the products of combustion from coming into contact with the catalytic agent.

8. In the production of ammonia by combining nitrogen and hydrogen under pressure by means of a catalytic agent at a raised temperature, raising the catalytic agent to the necessary temperature by admitting gas containing oxygen and igniting the mixture of hydrogen and oxygen which is formed, and allowing the flame to burn inside the catalytic agent, while preventing the products of combustion from coming into contact with the catalytic agent.

9. The production of ammonia by passing a mixture of hydrogen and nitrogen over a catalytic agent under pressure first admitting gas containing oxygen and igniting the mixture of hydrogen and oxygen which is formed, and allowing the flame to burn inside the catalytic agent while preventing the products of combustion from coming into contact with the catalytic agent, then cutting off the supply of gas containing oxygen and passing the mixture of nitrogen and hydrogen over the heated catalytic agent.

10. The production of ammonia by passing a mixture of hydrogen and nitrogen over a catalytic agent under pressure first admitting gas containing oxygen and igniting the mixture of hydrogen and oxygen which is formed, and allowing the flame to burn inside the catalytic agent while preventing the products of combustion from coming into contact with the catalytic agent, then cutting off the supply of gas containing oxygen and passing the mixture of nitrogen and hydrogen over the heated catalytic agent, in the opposite direction to that in which they were previously passing.

11. Apparatus for the production of ammonia from its elements under pressure comprising a plurality of vessels containing a hot catalytic agent and arranged in parallel, a circulating pump for moving the combined gases produced in said vessels, apparatus for separating the ammonia formed, a supply valve for adding fresh gases containing nitrogen and hydrogen and connection pipes distributing the gas in parallel over the contact vessels, all parts being capable of withstanding high pressure.

12. Apparatus for the production of ammonia from its elements under pressure comprising a plurality of vessels containing a hot catalytic agent and arranged in parallel, a circulating pump for moving the combined gases produced in said vessels, a supply valve for adding fresh gases containing nitrogen and hydrogen, apparatus for separating the ammonia contained in the whole gas mixture and connection pipes distributing the gas in parallel over the contact vessels, all parts being capable of withstanding high pressure.

13. Apparatus for the production of ammonia from its elements under pressure comprising the succession of a vessel containing catalytic agent, a circulating pump, a cooling apparatus, a supply valve for adding fresh gas mixture, an apparatus adapted to remove the ammonia, and a pipe leading back to the vessel containing the catalytic agent.

14. The process of producing ammonia which consists in passing a mixture of hydrogen and nitrogen in about combining proportions repeatedly over a catalytic agent, removing the ammonia formed between each passage by washing the gases leaving the catalyst with a liquid capable of absorbing ammonia, the gases and liquid being passed on the counter-current principle and subjected to cooling on their way through the washing operation, the whole process being effected while maintaining the pressure.

15. The process of producing ammonia by passing a mixture of nitrogen and hydrogen in practically combining proportions and under pressure over a catalytic agent, then through a circulating pump, then separating the ammonia from the gases, then leading the gases through a stripper in order to remove absorbing liquid, then adding fresh mixture of nitrogen and hydrogen and then passing the mixture anew over the catalytic agent.

16. The process of producing ammonia by passing a mixture of nitrogen and hydrogen in practically combining proportions and under pressure over a catalytic agent, then through a circulating pump, then adding fresh mixtures of nitrogen and hydrogen, then separating the ammonia from the gases, then leading the gases through a stripper and then passing the residual gases anew over the catalytic agent.

17. Apparatus for the production of ammonia comprising a compressor, a battery of pressure cylinders, a purifier, and means for leading the gases leaving the purifier to the circuit, said circuit containing a circulating pump, a plurality of regenerators, a vessel containing catalytic agent, and means for absorbing ammonia from the gases containing it.

18. Apparatus for the production of ammonia comprising a compressor, a battery of pressure cylinders, a purifier, and means for leading the gases leaving the purifier to the circuit, said circuit containing a circulating pump, a plurality of regenerators, a vessel containing catalytic agent, and means for absorbing ammonia from the gases containing it, and means for removing the absorbing liquid from the gases before the latter are returned to the catalytic agent.

19. Apparatus for the production of ammonia comprising a compressor, a purifier, and means for leading the gases leaving the purifier to the circuit, said circuit containing a circulating pump, a plurality of regenerators, a vessel containing catalytic agent, and means for absorbing ammonia from the gases containing it.

20. Apparatus for the production of ammonia comprising a compressor, a battery of pressure cylinders, means for leading the gases to the circuit, said circuit containing a circulating pump, a plurality of regenerators, a vessel containing catalytic agent, and means for absorbing ammonia from the gases containing it.

21. Apparatus for the production of ammonia comprising a compressor, a battery of pressure cylinders, a purifier, means for leading the gases leaving the purifier to the circuit, said circuit containing a circulating pump, a double spiral regenerator and one, or more, tubular regenerators, a vessel containing catalytic agent, and means for absorbing ammonia from the gases containing it.

22. Apparatus for use in the synthetic production of ammonia comprising a vessel containing catalytic agent, a tube through the said catalytic agent and means for passing hot combustion gases through the said tube, while preventing them from coming into contact with the catalytic agent.

23. Apparatus for use in the synthetic production of ammonia comprising a vessel containing catalytic agent, a tube through the said catalytic agent, means for causing a combustible gas to burn with oxygen in the said vessel, and means for passing the products of combustion through the said tube, while preventing them from coming into contact with the catalytic agent.

24. Apparatus for use in the synthetic production of ammonia comprising a vessel containing catalytic agent, a tube through the said catalytic agent, means for causing a combustible gas to burn with oxygen in the said vessel, means for passing the products of combustion through the said tube, while preventing them from coming into contact with the catalytic agent, and means for passing nitrogen and hydrogen through the catalytic agent and through the said tube.

25. A catalytic furnace for the production of ammonia containing in combination a shell capable of confining more than 100 atmospheres pressure, a lining substantially immune from forming carbon compounds with hydrogen, and a catalyst receptacle of heat-proof material separated from the lining by a passage for the nitrogen gases on the way to the catalyst.

26. A catalytic furnace for the production of ammonia containing in combination a shell capable of confining more than 100 atmospheres pressure, a lining substantially immune from forming carbon compounds with hydrogen, and a catalyst receptacle of heat-proof material separated from the lining by a passage for the nitrogen gases on the way to the catalyst and a heat regenerator forming an exit for the catalyst gases.

27. A catalytic furnace for the production of ammonia containing in combination a shell capable of confining more than 100 atmospheres pressure, a lining substantially immune from forming carbon compounds with hydrogen, a catalyst receptacle of heat-proof material, and a heat regenerator leading from the exit of the catalyst receptacle said regenerator and receptacle being separated from the said lining by the passage of the hydrogen and nitrogen gases on their way to the catalyst.

In testimony whereof I have hereunto set my hand in the presence of two subscribing witnesses.

CARL BOSCH.

Witnesses:
T. ALEC. LLOYD,
JOSEPH PFEIFFER.